United States Patent [19]

Smith

[11] Patent Number: 5,290,076
[45] Date of Patent: Mar. 1, 1994

[54] QUICK ACTIVATING PRESSURE VESSEL CLOSURE

[75] Inventor: John D. Smith, Houston, Tex.

[73] Assignee: ABB Vetco Gray Inc., Houston, Tex.

[21] Appl. No.: 856,108

[22] Filed: Mar. 23, 1992

[51] Int. Cl.$^5$ ............................................... E05C 7/00
[52] U.S. Cl. ...................................... 292/25; 292/201; 292/256.5; 292/DIG. 72
[58] Field of Search .................... 292/25, 11, 18, 207, 292/110, 45, 56, DIG. 11, DIG. 25, DIG. 61, DIG. 72, 256.65

[56] References Cited

U.S. PATENT DOCUMENTS

| | | | |
|---|---|---|---|
| 2,797,017 | 6/1957 | Tangard | 292/45 X |
| 2,834,504 | 5/1958 | Annicq | 292/201 X |
| 3,797,882 | 3/1974 | Brimhall | 292/110 X |
| 3,856,338 | 12/1974 | Johnsson | 292/256.65 X |
| 4,093,176 | 6/1978 | Contastin | 292/110 X |
| 4,157,146 | 6/1979 | Svenson . | |
| 4,664,431 | 5/1987 | Kobayashi et al. | 292/25 X |
| 5,228,825 | 7/1993 | Fruchtbaum et al. | 414/684.3 |

FOREIGN PATENT DOCUMENTS

| | | |
|---|---|---|
| 2260411 | 1/1975 | Fed. Rep. of Germany . |
| 2356299 | 8/1980 | Fed. Rep. of Germany . |
| 657159 | 4/1979 | U.S.S.R. ............... 292/110 |
| 777191 | 11/1980 | U.S.S.R. ............... 292/201 |

OTHER PUBLICATIONS

Derwent's abstract, No. 90-088878/12, week 9012, Abstract of SU, B2, 1504-446-A (Novos Br Chem Eqpt), Aug. 30, 1989.

Primary Examiner—Rodney M. Lindsey
Attorney, Agent, or Firm—James E. Bradley

[57] ABSTRACT

A closure device for a lower opening of a coke drum pressure vessel is quick acting. The opening has an annular flange. An annular movable support encircles the pressure vessel above the flange. A stationary support secures to the flange below the movable support. A number of coil springs are evenly spaced around the stationary support between the stationary support and the movable support. Hydraulic cylinders between the movable and stationary support move the movable support axially relative to the stationary support. A head will abut the flange. Hooks mounted to the movable support will engage the head and pull the head tightly upward into engagement with the flange when the retracting cylinders are released. Pivotal cylinders will pivot the hooks between engaged and disengaged positions.

11 Claims, 2 Drawing Sheets

1

QUICK ACTIVATING PRESSURE VESSEL CLOSURE

BACKGROUND OF THE INVENTION

1. Field of the Invention

This invention relates in general to closing devices for pressure vessels and in particular to a closure head for a coke drum.

2. Description of the Prior Art

In a coke manufacturing process, high temperature petroleum products are placed inside a large pressure vessel. The pressure vessel may be as much as 80 feet high, with a nozzle or discharge opening on its bottom. A head, which is a large, flat plate up to six or seven feet in diameter, secures across the opening of the nozzle. The plate bolts to a flange on the pressure vessel by a large number of bolts.

Subsequently, the high temperature petroleum products will be quenched and cooled with water, forming coke. After cooling, the head is removed and a chute positioned below the nozzle. High pressure water jets will be used to break up the coke, which flows out the opening of the nozzle.

The process of removing and reinstalling the head is time consuming and messy. A carriage moves under the head to engage the lower side and provide support during the removal and installation process. Workers must physically unscrew all of the bolts, which can number 60 or so. There have been various proposals in the past to improve head closures, however generally these proposals are complex.

SUMMARY OF THE INVENTION

In this invention, a closure device includes an annular movable support encircling the pressure vessel above the flange. A stationary support secures to the flange below the movable support and extends radially outward. A plurality of coil springs are spaced evenly around the pressure vessel, each of the springs having an upper end in engagement with the movable support. A plurality of hydraulic cylinders connect between the movable support and the stationary support for pulling the movable support downward to a lower position, further compressing the coil springs.

The head is a single piece flat plate having an upper side which abuts the flange for closing the opening. A plurality of hooks are evenly spaced around and carried by the movable support. Each hook extends radially inward for engaging a lower side of the head to hold the head in abutment with the flange. A pivotal cylinder will pivot the hooks radially inward and outward when the hydraulic cylinders have positioned the movable support in the lower position.

DETAILED DESCRIPTION OF THE INVENTION

Figure 1:
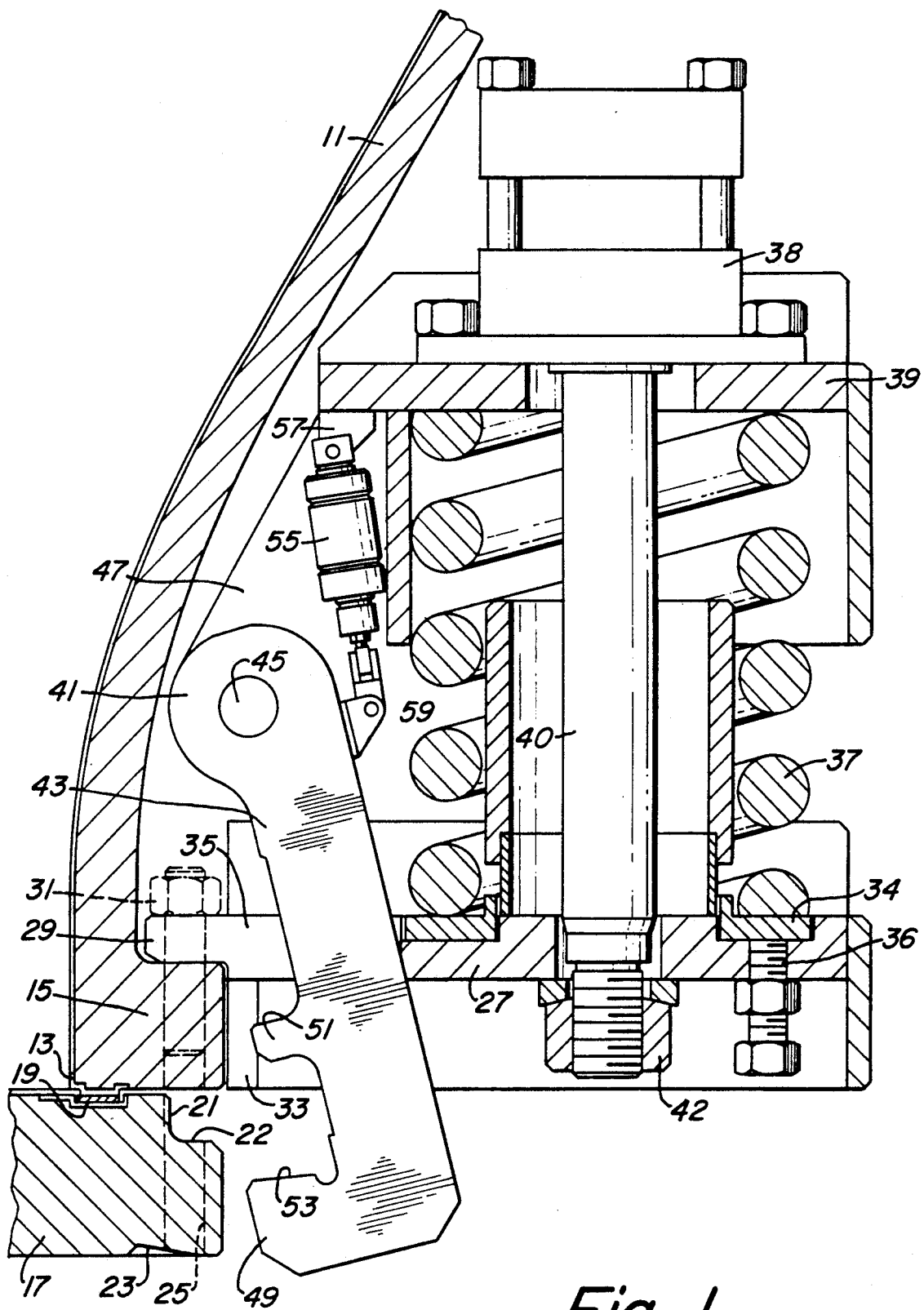
FIG. 1 is a sectional view of a portion of a closure device for a pressure vessel, showing a movable support in an upper position, and showing a hook in an outer released position.

Referring to FIG. 1, pressure vessel 11 is a large tubular member having a nozzle at its lower end. An opening 13 that is circular locates at the bottom of the nozzle. An external flange 15 surrounds opening 13 and may be integrally formed with pressure vessel 11.

A head 17 will close opening 13. Head 17 is a large single-piece flat plate having a circular perimeter. Head 17 has a mating surface on its upper side that receives a gasket 19 for sealing against the lower side of flange 15.

Head 17 in this embodiment has a plurality of upper or breakout recesses 21 evenly spaced around its perimeter. Each breakout recess 21 extends a short circumferential distance and is spaced apart from adjacent recesses 21 (only one shown). Each breakout recess 21 defines an upward facing breakout shoulder 22. Each of the shoulders 22 of breakout recess 21 is in a plane perpendicular to the longitudinal axis of pressure vessel 11. Alternately, recesses 21 and shoulders 22 can be a continuously annular surface about the perimeter of head 17.

The lower side of head 17 has at its outer edge a plurality of lower or tapered recesses 23. Lower recesses 23 also extend a short circumferential distance and are evenly spaced apart from each other in an identical manner to the upper recesses 21. The lower recesses 23 are inclined, tapering downward a few degrees in a radial outward direction. Alternately, recesses 23 can be a continuously annular surface about the longitudinal axis of head 17.

Head 17 also has a plurality of circular holes 25 spaced around the perimeter. Holes 25 are not located in the same radial plane as the recesses 21, 23. Holes 25 receive locator pins which extend upward into mating holes in flange 15 to orient head 17 with pressure vessel 11. The axis of each hole 25 is parallel with the longitudinal axis of pressure vessel 11.

A stationary support 27 mounts to the upper side of flange 15. Stationary support 27 is an annular plate with an inner lip 29 that is supported on the upper surface of flange 15. Preferably, stationary support 27 comprises two segments, each extending 180 degrees, which are secured together at installation. A plurality of threaded studs 31 secure the stationary support 27 to flange 15. Studs 31 are located in different radial planes than the recesses 21, 23 and are spaced circumferentially around the flange 15.

Figure 3:
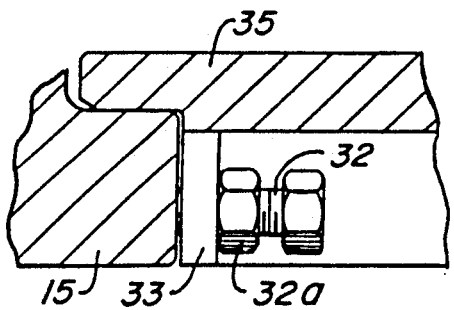
FIG. 3 is an enlarged sectional view of a portion of closure device of FIG. 1.

A vertical brace 33 on the inner side of stationary support 27 abuts the outer perimeter of flange 15 to provide additional support. Brace 33 is also in a different sectional plane than the plane shown in FIG. 1. A plurality of jack screws 32 extend through braces 33, as illustrated in FIG. 3. Jack screws 32 bear against the cylindrical exterior of flange 15 to provide support for stationary support 27. Jack screws 32 can be adjusted to the desired amount and secured by locknuts 32a.

Stationary support 27 has a plurality of slots 35 spaced evenly around the circumference. Each slot 35 extends circumferentially a short distance and is spaced even circumferential distances apart from adjacent slots 35 the same amount as head recesses 21, 23. When head 17 is aligned and oriented properly, recesses 21, 23 will vertically align with slots 35.

A plurality of metal rings 34 locate on the upper side of stationary support 27. Rings 34 are spaced circumferentially apart from each other. Three bolts 36 (only one shown) secure to threads in stationary support 27 for each ring 34. The upper ends of bolts 36 protrude through the stationary support 27 and contact ring 34. The contact points are 120 degrees apart from each other around the axis of each ring 34.

A plurality of coil springs 37 (only one shown) are supported on stationary support 27. Each spring 37 is the same diameter as and rests on one of the rings 34. Each coil spring 37 has an axis that is parallel with the longitudinal axis of pressure vessel 11. Coil springs 37 are evenly spaced around the circumference of stationary support 27. Although the drawings appear to show coil springs 37 in the same plane as slots 35, they actually are spaced circumferentially from slots 35 a short distance. That is, a radial plane extending through the axis of each coil spring 37 will not bisect slot 35.

A movable support 39 locates at the upper ends of coil springs 37. Movable support 39 is an annular plate extending around pressure vessel 11 parallel to stationary support 27. Movable support 39 will move between an upper releasing position shown in FIG. 1 and a lower engaging position shown in FIG. 2. Movable support 39 is preferably segmented into two 180 degree portions and secured together at installation.

A retractor comprising a hydraulic cylinder 38 and a rod 40 for each coil spring 37 will move movable support 39 between the upper and lower positions. One of the hydraulic cylinders 38 locates concentrically with each coil spring 37. Alternately, there may be one hydraulic cylinder 38 for every other coil spring 37. Each hydraulic cylinder 38 locates on the upper side of movable support 39. Rod 40 extends through a hole in movable support 39, concentric with the axis of each coil spring 37. A nut 42 secures to the lower end of each rod 40 to secure the rod 40 to the stationary support 27. Rod 40 has a length so as to place coil spring 37 in compression when the movable support 39 is in the upper position shown in FIG. 1. Coil springs 37 thus bias the movable support 39 upward. Actuating hydraulic cylinder 38 will retract rod 40, to pull movable support 39 downward. This further compresses coil spring 37.

By adjusting bolts 36, the compression in each spring 37 can be independently set and controlled. Tightening bolts 36 further causes the ring 34 to move upward, further compressing spring 37 to increase the bias. Loosening bolts 36 will reduce the amount of bias. Ring 34 and bolts 36 thus serve as adjusting means for independently adjusting the bias of each coil spring 37.

A plurality of hooks 41 secure to the movable support 39. Hooks 41 are spaced circumferentially around the movable support 39 at even spacings apart from each other. A hook 41 preferably exists for each coil spring 37. Each hook 41 is located in a radial plane of the longitudinal axis of pressure vessel 11. Each radial plane will differ from the radial plane that contains the hydraulic cylinder rod 40 by a short circumferential distance. Each hook 41 has a shank 43 that extends downward through the slot 35. A pivot pin 45 secures the upper end of shank 43 pivotally to a brace 47. Brace 47 is rigidly secured to and forms a part of movable support 39.

Each hook 41 has a lower retaining projection 49 that projects radially inward. Each hook 41 also has an upper breakout projection 51 that is spaced above retaining projection 49. The distance between the upper surface 53 of retaining projection 49 and the lower surface of breakout projection 51 is greater than the distance between recesses 21, 23 of head 17. Consequently, as shown in FIG. 2, when hook 41 is in the engaged position, engaging surface 53 will engage recess 23 and the lower surface of breakout projection 51 will engage the upward facing shoulder 22 of breakout recess 21.

Engaging surface 53 has a taper that is identical to the taper of recess 23. When hook 41 is in the engaged position of FIG. 2, surface 53 tapers downward in a radial outward direction. The amount of taper is only a few degrees and is selected so as to be a locking taper. That is, an excessive downward force imposed on head 17 when in the closed position will not be able to push the hook projections 49 outward to a released position. There would be no outward force component which could cause unlocking movement of the hooks 41.

The breakout projections 51 serve to push the head 17 downward from flange 15 during the opening movement. Sometimes, head 17 might stick to flange 15 due to the coke formed in the pressure vessel 11. The downward force of hydraulic cylinders 38 will act on the breakout projections 51 to push the head 17 downward from flange 15.

Figure 2:
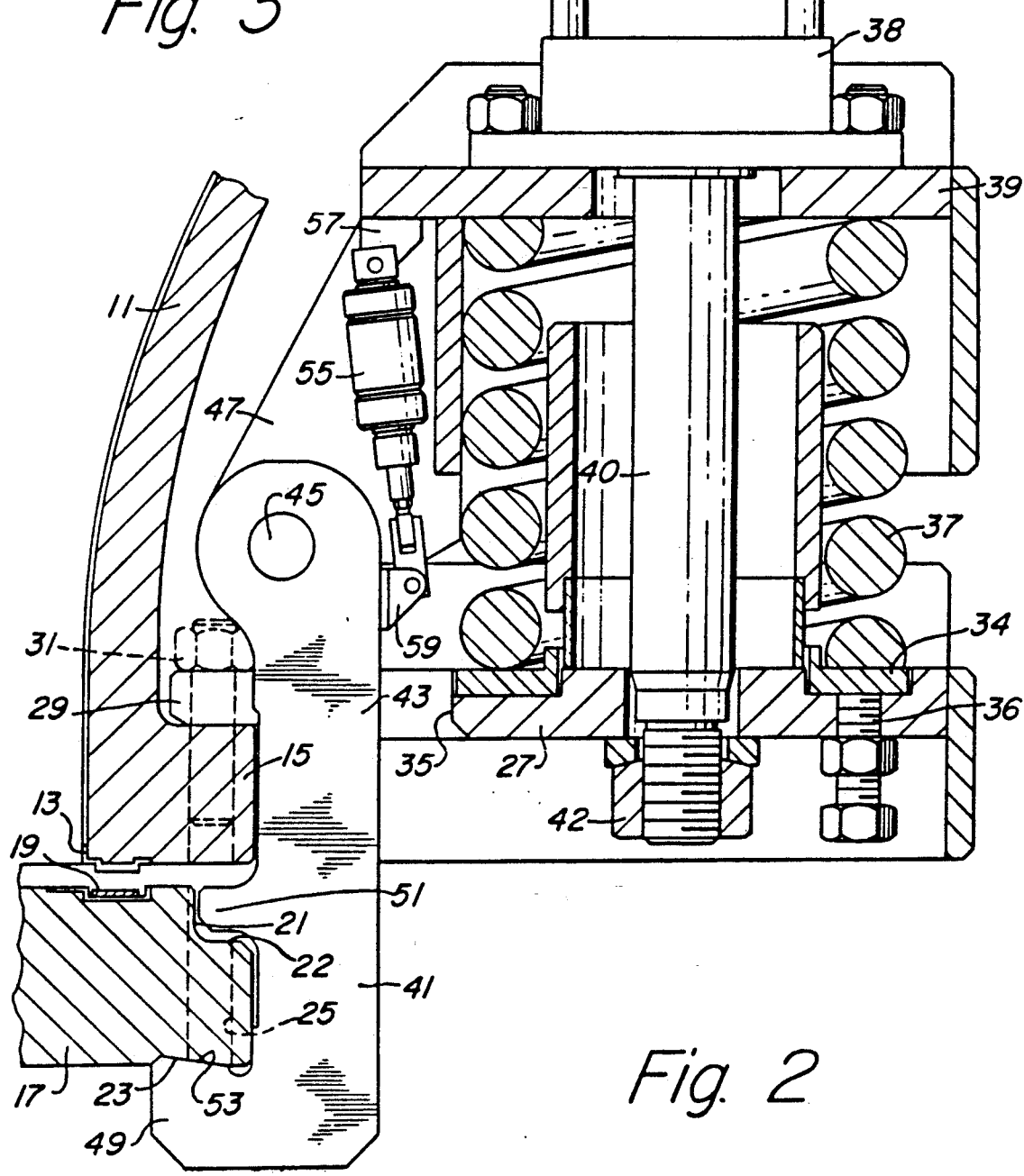
FIG. 2 is sectional view of a portion of the closure device as shown in FIG. 1, but showing the movable support being pulled to a lower position and showing the hook in an engaged position.

A pivot means comprising a pivot cylinder 55 will pivot each hook 41 from the released position of FIG. 1 to the inner engaged position of FIG. 2. Pivot cylinder 55 is a smaller hydraulic cylinder than hydraulic cylinder 38. The upper end of pivot cylinder 55 pivotally secures to a bracket 57 that is rigidly secured to movable support 39. The lower end of pivot cylinder 55 pivotally secures to a bracket 59 that is secured to each hook 41.

Supplying pressurized fluid to pivot cylinder 55 when movable support 39 is in the lower position will cause pivot cylinder 55 to extend, pivoting each hook 41 from the position shown in FIG. 1 to that shown in FIG. 2. Pivot cylinders 55 are capable of moving the hooks 41 between the engaged and released position only when the movable support 39 is in its lower position. The friction of the retaining projections 49 pushing upward on the head 17 due to the force of springs 37 is greater than the force that can be exerted by the pivot cylinders 55.

To install head 17, a carriage on wheels (not shown) of conventional design will roll beneath pressure vessel 11. Carriage will be supporting head 17 in a horizontal orientation. The carriage will lift head 17 upward into near abutment with flange 15 as illustrated in FIG. 2.

The operator will actuate the retracting hydraulic cylinders 38 to cause the movable support 39 to move to the lower position shown in FIG. 2. The operator then actuates pivot cylinders 55 to cause the hooks 41 to move to the engaged position of FIG. 2. Hooks 41 will engage the edge of head 17.

The operator then releases the hydraulic pressure from the retracting cylinders 38. This results in the springs 37 pushing the movable support 39 back upward to the upper position of FIG. 1. In doing so, the hooks 41 will pull the head 17 upward into tight abutment with the lower surface of flange 15. The carriage below the head 17 will not provide any support at this point and may be removed. This completes the closure. The springs 37 provide an upward bias force to hold the head 17 in tight engagement with the flange 15.

To open the opening 13, the operation is reversed. The operator will position the carriage below the head 17. The operator will actuate the retracting cylinders 38 to move the movable support 39 to the lower position. If head 17 is stuck to flange 15, breakout projections 51 will push downward on the breakout shoulders 22 on head 17. This causes the head 17 to move to the position shown in FIG. 2. The operator will engage the hydraulic support (not shown) of the carriage with the lower side of head 17.

The operator will then pivot the hooks 41 to the released position by retracting the pivot cylinders 55. The operator then will release the hydraulic pressure on the retracting cylinders 38 to allow the movable support 39 to move to the upper position. The carriage will move the head 17 from under the opening 13 for further operations.

The invention has significant advantages. The closure mechanism is fast acting. Workers do not need to install and remove a large number of bolts. The locking taper on the hooks prevents accidental releasing of the head. The breakout projections break the head away from the flange during the opening procedure. The springs may be independently adjusted to provide an even force around the large diameter head.

While the invention has been shown in only one of its forms, it should be apparent to those skilled in the art that it is not so limited, but is susceptible to various changes without departing from the scope of the invention.

I claim:

1. A closure device for an opening of a pressure member, the pressure member having an annular flange encircling the opening, comprising in combination:
   an annular movable support encircling the pressure member;
   retractor means connected to the movable support for moving the movable support axially relative to a longitudinal axis of the pressure member between an engaging position and a releasing position;
   a plurality of coil springs evenly spaced around the pressure member, each of the coil springs having one end in engagement with the movable support for axial movement therewith;
   stationary support means on the flange for stationarily supporting an opposite end of each of the springs, each of the springs biasing the movable support away from the stationary support means and being further compressed when the retractor means moves the movable support to the releasing position;
   a head having a mating surface on one side for abutment with the flange for closing the opening, the head having an opposite side opposite the side having the mating surface;
   a plurality of hooks evenly spaced around and carried by the movable support for axial movement therewith, each having a shank pivotally mounted to the movable support and a retaining projection protruding radially inward for engagement with the opposite side of the head, with the bias of the springs urging the head into abutment with the flange for closing the opening when the movable support is in the engaging position; and
   pivotal means for pivoting each of the hooks selectively radially inward to an engaged position and radially outward to a released position while the movable support is in the releasing position, to allow removal and also installation of the head.

2. The closure device according to claim 1 wherein the retractor means comprises a plurality of hydraulic cylinders mounted between the stationary support means and the movable support.

3. The closure device according to claim 1 wherein the retractor means comprises a plurality of hydraulic cylinders mounted between the stationary support means and the movable support, each of the hydraulic cylinders being mounted concentrically within one of the springs.

4. The closure device according to claim 1 wherein the pivotal means comprises a piston and cylinder mounted between each of the hooks and the movable support.

5. The closure device according to claim 1, further comprising:
   a tapered surface on the opposite side of the head, the tapered surface extending downward in a radial outward direction relative to the longitudinal axis of the pressure member; and
   a mating tapered surface on the retaining projection of each of the hooks for engaging the tapered surface on the head.

6. The closure device according to claim 1, further comprising:
   a breakout shoulder on the head facing away from the opposite side of the head; and
   a breakout projection located on the shank of each of the hooks and protruding radially inward for engaging the breakout shoulder when the hooks are in engagement with the head, the breakout projection pushing the head away from the flange when the retractor means moves the movable support to the releasing position.

7. A closure device for a lower opening of a pressure vessel, the pressure vessel having an annular flange encircling the opening, comprising in combination:
   an annular movable support encircling the pressure vessel above the flange and being axially movable relative to a longitudinal axis of the pressure vessel;
   an annular stationary support secured to the flange below the movable support and extending radially outward therefrom;
   a plurality of coil springs evenly spaced around the pressure vessel, each of the coil springs having an upper end in engagement with the movable support for axial movement therewith and a lower end in engagement with the stationary support;
   a plurality of hydraulic cylinders connected between the movable support and the stationary support for moving the movable support axially relative to a longitudinal axis of the pressure vessel between an upper position and a lower position;
   a head being a single piece flat plate having an upper side with a circular mating surface for abutment with the flange for closing the opening, the head having a lower side;
   a plurality of hooks evenly spaced around and carried by the movable support for axial movement therewith, each having a shank pivotally mounted to the movable support and a retaining projection protruding radially inward for engagement with the lower side of the head with the springs urging the head into abutment with the flange for closing the opening when the movable support is in the upper position; and
   pivotal means for pivoting each of the hooks selectively radially inward to an engaged position and radially outward to a released position while the movable support is in the lower position, to allow removal and also installation of the head.

8. The closure device according to claim 7 wherein each of the hydraulic cylinders is mounted concentrically within one of the springs.

9. The closure device according to claim 7 wherein the pivotal means comprises a piston and cylinder mounted between each of the hooks and the movable support.

10. The closure device according to claim 7 wherein each of the retaining projections of the hooks has an upper tapered surface that inclines downward in a radially outward direction; and wherein
the lower side of the head has a mating tapered surface for each retaining projection that inclines downward in a radially outward direction at the same angle as the upper tapered surfaces of the retaining projections.

11. The closure device according to claim 7, further comprising:
an upward facing breakout shoulder on the head; and
a breakout projection located on the shank of each of the hooks above the retaining projection and protruding radially inward for engaging the breakout shoulder when the hooks are in engagement with the head, the breakout projection pushing the head downward from the flange when the retractor means moves the movable support to the lower position.

* * * * *